March 23, 1954
R. F. ROGERS
2,672,771
BORING BAR
Filed March 23, 1953
2 Sheets-Sheet 1
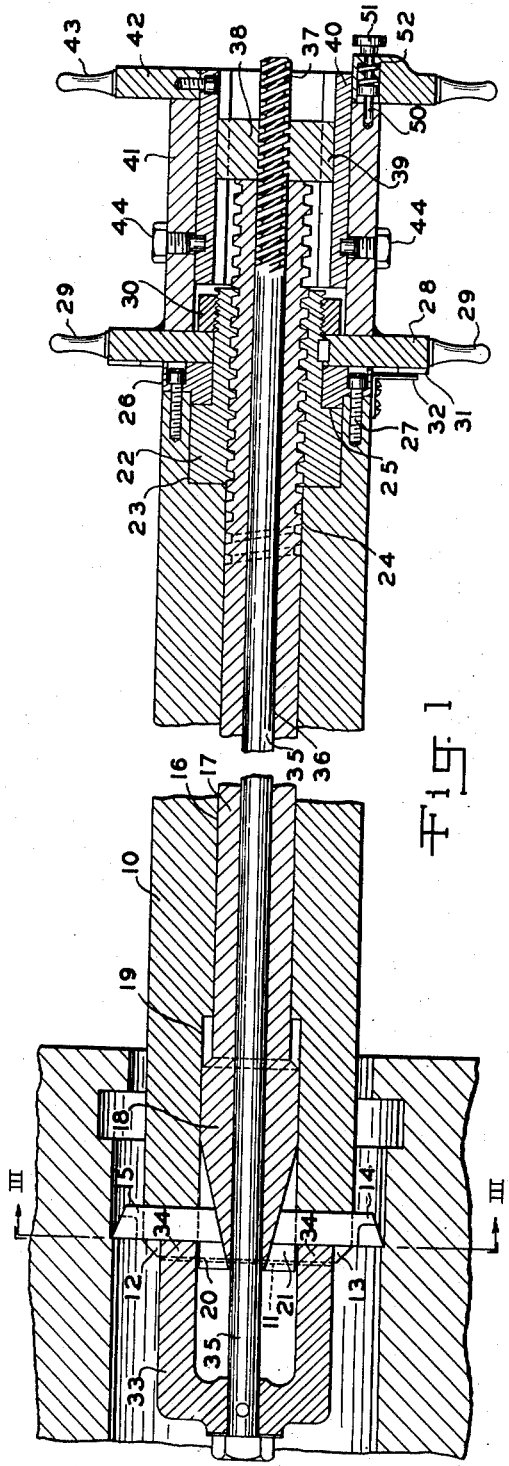
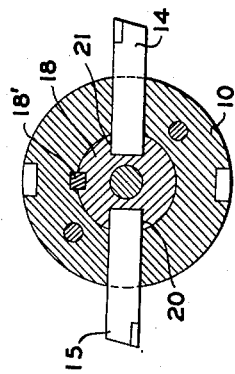
Fig. 3
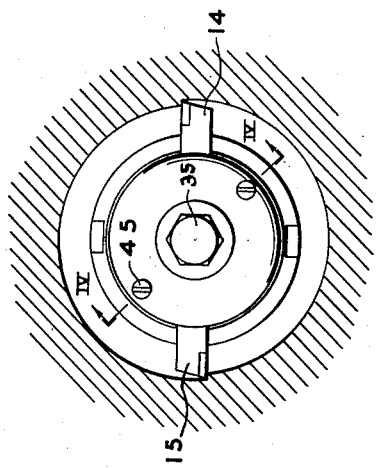
Fig. 2
INVENTOR
RUSSELL F. ROGERS
BY Francis J. Klempay
ATTORNEY March 23, 1954
R. F. ROGERS
2,672,771
BORING BAR
Filed March 23, 1953
2 Sheets-Sheet 2
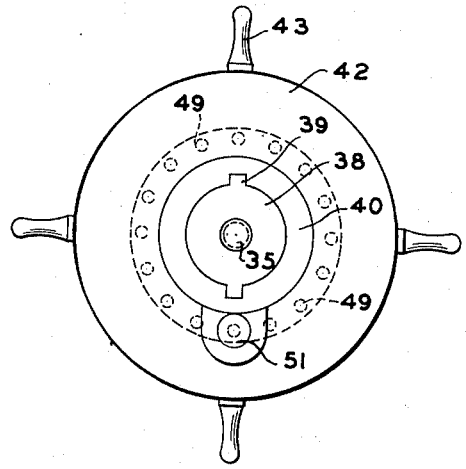
Fig. 5
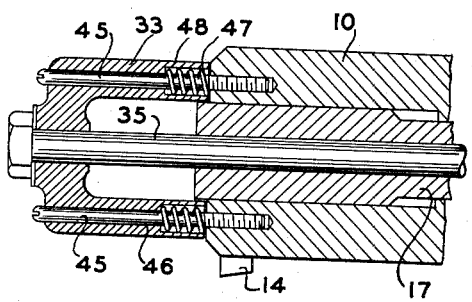
Fig. 4
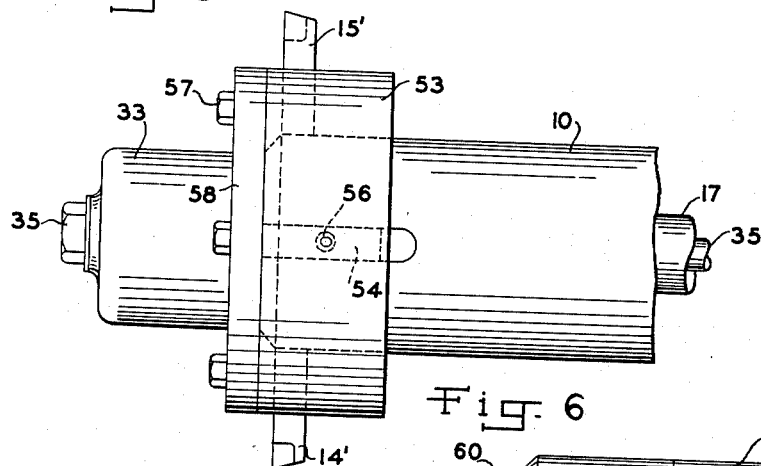
Fig. 6
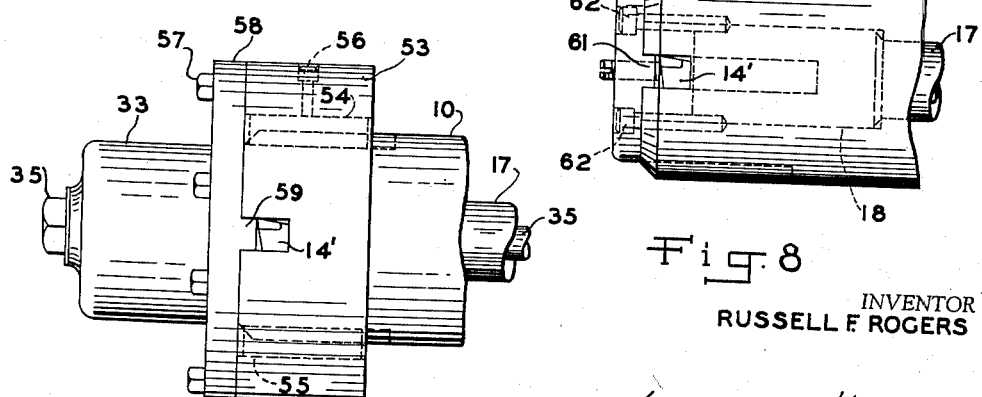
Fig. 7
Fig. 8
INVENTOR
RUSSELL F. ROGERS
BY *Francis J. Klempay*
ATTORNEY Patented Mar. 23, 1954

2,672,771

UNITED STATES PATENT OFFICE 2,672,771

BORING BAR

Russell F. Rogers, Youngstown, Ohio

Application March 23, 1953, Serial No. 343,826

13 Claims. (Cl. 77—58)

The present invention relates to boring bars of the type having a plurality of cutters and means to radially adjust the cutters, and more particularly to various features of construction of this apparatus whereby the same may be simply and inexpensively constructed, more easily operated and generally more suitable for the purpose intended.

An object of the present invention is the provision of a boring bar of the type having a pair of diametrically opposed cutting tools which is characterized by the provision of improved arrangements for adjusting the cutting tools in a radial direction and for clamping or locking the tools in any desired adjusted position.

Another object of the invention resides in the provision of a boring bar of the general type described above wherein adjusting and locking of the cutting tools or bits may be effected from one end of the boring bar apparatus, which one end is remote from the cutting tools.

Another object of the invention is to provide a boring bar having means to adjust and clamp one or more cutting tools wherein novel means are provided for applying a predetermined clamping pressure to the cutting tools and to thereafter effect radial adjustment of the tools without altering such predetermined clamping pressure.

Yet another object of the invention is the provision of a boring bar having the above described general characteristics wherein novel and highly simplified means are provided for enlarging the operating range of the apparatus. Thus, boring bars of the type employing two or more opposed cutting tools must ordinarily be positioned concentrically in an opening to be machined, and enlargements of the opening are effected by moving the plurality of cutters radially outward of a supporting member therefor rather than by moving the supporting member laterally as may be done where only a single cutter is utilized. However, it will be readily apparent that as the size of the bore becomes relatively large in relation to the supporting member for the cutters the latter will be poorly supported adjacent the cutting edges, and tool chatter and breakage may result. Accordingly, the present invention seeks to provide a simple and wholly practical arrangement for modifying a standard cutter support member so that the same may provide adequate support for cutting tools even where the size of the opening is substantially larger than the standard support member.

Another object of the invention is the provision in a boring bar of the general type described of an improved arrangement for mounting a plurality of cutting tools on the bar whereby the apparatus may be effectively employed in machining "blind" bores, that is, bores having entrance openings of reduced diameter. And more specifically, this object contemplates the provision of an improved arrangement for mounting a plurality of cutting tools whereby, upon completion of a machining operation upon a "blind" bore, the extended cutting tools may be readily collapsed to permit ready retraction of the boring bar from the bore without damage to the bore or tools.

A further object of the invention resides in the provision of a boring bar having the above described characteristics which, in addition, may be readily modified into a conventional boring bar wherein, for example, a single cutting tool is fixedly secured in the support member therefor, the support being moved laterally in the opening to be machined in order to effect adjustments.

The above and other objects and advantages of the invention will become apparent upon full consideration of the following detailed specification and accompanying drawing wherein is shown a preferred embodiment of the invention.

In the drawing:

Figure 1 is a longitudinal section view of a boring bar device constructed in accordance with the teachings of my invention;

Figure 2 is a left hand end view of the apparatus of Figure 1;

Figure 3 is a section view taken generally along line III—III of Figure 1;

Figure 4 is a fragmentary section view taken generally along line IV—IV of Figure 2;

Figure 5 is a right hand end view of the apparatus of Figure 1;

Figure 6 is a fragmentary top plan view of a modification of the apparatus of Figure 1;

Figure 7 is a side elevation of the apparatus of Figure 6; and

Figure 8 is a fragmentary view of a second modification of the apparatus of Figure 1.

Referring now to the drawing, and initially to Figure 1, the numeral 10 designates an elongated cylindrical support member of my boring bar apparatus which may comprise a length of pierced seamless tubing, for example, of as much as twelve feet in length, having a generally flat forward (left) end surface 11 and a pair of diametrically opposed slots 12 and 13 extending inwardly from the surface 11. Received in the slots 12 and 13 is a pair of oppositely directed cutting tools or bits 14 and 15, and in accordance with the teachings of the invention the bits 14 and 15 are closely received in the slots 12 and 13 but readily movable therein.

The support member 10, as shown, is provided throughout its length with a bore or cylindrical opening 16 which is adapted to slidably receive an operating rod 17 having an enlarged head end portion 18 received in an enlarged forward end portion 19 of the bore 16. Preferably the rod 17 and support 10 are keyed against relative rotation by a key 18'.

In accordance with the invention the enlarged portion 18 is provided with a pair of diametrically opposed slots 20 and 21 having inclined lower bearing surfaces adapted to bear against the inner ends of the tool bits 14 and 15, which inner ends are preferably inclined in the manner shown in Figure 1 to properly engage the bearing surfaces of slots 20 and 21. The arrangement, as will be readily apparent, is such that upon longitudinal sliding movement of the rod 17 in a forward direction the tool bits 14 and 15 will be caused to move radially outward of the support 10 equal amounts on either side of the support so that cutting may be effected at a larger diameter.

It will be observed in Figure 3 that the slots 20 and 21 are provided with parallel sides having sliding rather than interlocking engagement with the tool bits 14 and 15 so that no means is afforded for retracting the bits 14 and 15 upon rearward longitudinal movement of the operating rod 17. This is a preferred arrangement for many types of operations since conventional tool bits may be employed with little or no modification. However, it will be understood that wherever desired the rod 17 and bits 14 and 15 may be modified to have dovetailed or other interlocking engagement whereby positive movement of the bits 14 and 15 may be effected by movement of the rod 17 in either longitudinal direction.

In order to effect longitudinal adjusting movement of the operating rod 17 with positiveness and precision I have provided a rotatable nut 22 which is received in an enlarged portion 23 of the bore 16 at the right hand or operating end of the support 10. The nut 22 is arranged to engage threads 24 provided at the operating end of the rod 17, and in the illustrated embodiment of the invention the threads 24 are formed with a left-hand lead so that upon clockwise rotation of the nut 22 the rod 17 will be caused to move forwardly with respect to the nut.

As shown in Figure 1 the nut 22 is elongated and provided with an enlarged forward portion which defines a shoulder 25 facing outwardly of the operating end of the boring bar apparatus. Thus, to prevent longitudinal movement of the nut relative to the support 10 I may provide an annular retaining ring 26 having an inner bearing face thereon adapted to slidably engage the shoulder 25 whereby to permit rotational movement of the nut 22 while rigidly confining the same longitudinally. The retaining ring is preferably secured to the support 10 by means of a plurality of circumferentially spaced bolts 27, as shown.

Mounted on the outwardly projecting end portion of the nut 22 and keyed thereto is an operating wheel 28 which extends radially outward of the support 10 and is provided at spaced points about its periphery with projecting handles 29 to facilitate engagement of the operating wheel 28 by a machine attendant. The wheel 28, in the present embodiment of the invention, is retained on the nut 22 by means of a second nut 30 engaging threads provided at the outer end portion of nut 22.

Thus, it will be apparent that longitudinal movement of the rod 17 may be effected by appropriate rotational manipulation of the operating wheel 28, and clockwise rotation of the wheel 28 will cause forward movement of the rod 17 and an accurately related outward radial movement of the tool bits 14 and 15. And, where desired, rotational movement of the operating wheel 28 may be measured in terms of radial movement of the bits 14 and 15 by means of a suitably calibrated dial 31, carried by the wheel 28, and indicator 32 therefor, mounted on the support 10.

In order to securely clamp the tool bits 14 and 15 in any adjusted position so that a cutting or boring operation may be properly carried out I have provided an end cap member 33 which is generally cup-like in shape and is provided with projecting lugs 34 which are adapted to be received in the open longitudinal ends of slots 20 and 21 and to bear against the forwardly exposed surfaces of tool bits 14 and 15 whereby to cause the bits to be clamped between the lugs 24 and the inner walls of the slots 20 and 21. The outer end of the end cap 33 is bored longitudinally to receive an elongated bolt or tension rod 35 which is in turn received in an elongated bore 36 which extends throughout the length of the operating rod 17 in concentric relation thereto. As shown in Figure 1 the tension rod 35 extends outwardly of the right hand end of the operating rod 17, and is provided at that same end with threads 37. A nut 38 engages the threads 37 and is arranged to bear against the right hand end surface of the operating rod 17 so that the tension rod 35, and accordingly the end cap 33 may be drawn firmly toward the operating rod by appropriate manipulation of the nut 38. Thus, when the operating rod 17 is adjusted to any desired longitudinal position to effect a proper setting of the tool bits 14 and 15, the nut 38 may be rotated on the tension rod 35 in such manner as to draw the end cap 33 into firm clamping engagement with the tool bits 14 and 15 to firmly retain the same in adjusted position through subsequent cutting operations.

In the illustrated embodiment of the invention the nut 38 is provided with radially extending key-like projections 39 (see Figure 5) which are adapted to slidably engage suitable keyways provided in a cylindrical member 40 which is positioned at the right hand or operating end of the boring bar apparatus in surrounding relation to the rods 17 and 35. In accordance with the teachings of the invention the cylindrical member is guided for rotary movement by a larger cylindrical member 41 which is secured to and carried by the operating wheel 28. And secured to the outer extreme end of the inner cylindrical member 40 is a second operating wheel 42 which is substantially similar to the wheel 28, having a plurality of handles 43 about its outer periphery. Preferably the inner cylindrical member 40 is provided with an annular groove about its outer surface which is adapted to be engaged by one or more bolts or set screws 44 carried in the outer cylindrical member, so that relative longitudinal movement between the cylindrical members 40 and 41 is prevented while the same parts may have relative rotational movement.

Thus it will be apparent that adjustment of the tool bits 14 and 15 may be effected by rotation of the operation wheel 28, while subsequent clamping of the bits may be effected by rotation of the second operating wheel 42 to cause nut 38 to be urged against the end surface of rod 17.

In order to withdraw the boring apparatus from a blind bore after completion of a cutting operation it may be necessary to first collapse or retract the outwardly extending tool bits 14 and 15. And in accordance with the teachings of the present invention this may be accomplished by backing off the nut 39 a substantial extent to completely free the bits 14 and 15 in their respective retaining slots. Thus, when the boring apparatus is retracted the bits 14 and 15 will, in effect, fold inwardly, or in some cases drop out of the support 10 so that the same may be readily withdrawn from the bore. The operating rod 17 need not be backed off to effect such withdrawal as will be apparent.

Usually, during withdrawal of the boring apparatus from a bore the end cap 33 is backed off to such an extent that the lugs 34 projecting therefrom are no longer received in slots 20 and 21. Accordingly, in order to maintain proper alignment between the lugs and slots to facilitate reclamping of the bits for a subsequent boring operation I have provided a pair of forwardly projecting guide rods 45, threaded inner end portions of which are received in the support 10 in the manner shown in Figure 4. The end cap 33 is provided with a pair of longitudinally extending bores 46 adapted to slidably receive the outer portions of the rods 45 so that the cap 33 remains properly aligned with the support 10 even when backed off therefrom to a substantial extent. Also, in the illustrated embodiment of the invention I have provided springs 47 which are received in suitable recesses 48 about the rods 45 and which act outwardly upon the end cap 33 so that upon release of the nut 39 the end cap 33 will be automatically urged away from the support 10 to completely free the bits 14 and 15 in the manner desired.

In many instances, and particularly in such operations as cutting internal bevels and the like, it is desirable to manipulate the tool bits 14 and 15 during the cutting operation while at the same time maintaining a predetermined clamping pressure on the bits to prevent chattering, for example. In accordance with the teachings of the invention I may provide for operation in this manner by forming the threads 24 and 37 of rods 17 and 35 of equal lead, but of opposite inclination, so that upon simultaneous rotation of both operating wheels 28 and 42 there is no relative displacement between the main operating rod 17 and nut 39. Thus, for example, if the wheel 28 is rotated through a predetermined arc in a clockwise direction there will be a longitudinal advancing movement of the operating rod 17 of a predetermined amount with respect to the support 10 and rod 35 which would normally cause the rod 17 to be moved away from the nut 39 to loosen the tool bits 14 and 15. However, if, upon rotation of the wheel 28, a simultaneous and exactly equal rotation of the wheel 42 is effected, the nut 39 may be caused to advance along the rod 35 in exact relation with the main operating rod 17 and there is no change in clamping pressure upon the bits 14 and 15.

Accordingly, I have provided a plurality of closely spaced bores 49 about the longitudinal end of the outer cylindrical member 41, any of which bores is adapted to receive a pin 50 which is carried by the second operating wheel 42 and arranged for longitudinal sliding movement with respect thereto. Thus, it will be apparent that the wheel 42 may be rotated independently of the wheel 28 to effect a predetermined clamping pressure upon the bits 14 and 15, whereupon the pin 50 may be inserted in one of the bores 49 to provide a positive lock between the wheels 28 and 42. During any subsequent adjustment of the tool bits by rotation of wheel 28, for example, the second wheel 42 will be carried in identical rotary movement and the preset clamping pressure is maintained uniformly upon the bits 14 and 15.

In the preferred embodiment of the invention the pin 50 is provided with an enlarged head portion 51 to facilitate manipulation by a machine attendant, and a spring 52 is provided to normally urge the pin 50 toward the plurality of bores 49, the arrangement being such that the spring 52 will insure that the wheels 28 and 42 remain locked together upon the same being set in any desired manner.

When the size of the opening to be bored is substantially greater in diameter than the support 10 it is usually desirable to provide additional support for the tool bits so that the same may be properly confined adjacent the point of cutting. Thus, in Figures 6 and 7 of the drawing, wherein the boring apparatus is illustrated with elongated tool bits 14' and 15', there is shown an enlarged supporting ring 53 which is mounted on the forward end of the support 10 and which is provided with suitable slots 54 arranged to coincide with slots 12 and 13 in the support member 10. Preferably the supporting ring 53 is readily slidable over the support 10, but in accordance with the teachings of the invention means, such as keys 54 and 55 are provided to prevent rotation of the ring 53 with respect to the support 10. And often it is desirable to provide one or more set screws 56 or similar devices so that the ring may be firmly held in position during use.

Secured to the forward end face of the supporting ring 53, by means of a plurality of cap screws 57, for example, is an annular retaining ring 58 having lugs 59 projecting outwardly of its right hand end face, which lugs are adapted to register with the tool bit-receiving slots in the support 10 and ring 53. The arrangement is such that when the rings 53 and 58 are in assembled relation with the support 10 elongated openings are provided for the tool bits 14' and 15' which openings are of such size as to substantially confine the bits while permitting radial sliding movement thereof.

As will be readily understood, the supporting and retaining rings 53 and 58 may be provided in a plurality of sizes so that the apparatus may be effectively employed in a variety of applications. And it is in accordance with the general teachings of the invention the rings or adaptors 53 and 56 may be readily assembled to and removed from the support 10 so that the apparatus may be readily adapted for most effective use in the desired application.

In Figure 8 I have shown another modification or adaptation of my apparatus wherein a flat end cap 60, having inwardly projecting lugs 61, is provided in place of the end cap 33. As will be observed by comparing Figures 4 and 8 the outwardly extending guide rods 45 are removed and suitable bolts 62 are received in the same threaded bores for the purpose of rigidly securing the end cap 60 to the support 10.

In the last mentioned modification of the invention the main operating rod 17 is preferably backed off so that the enlarged end portion 18 thereof does not underlie tool bit 14", and one or more set screws 63 are provided in the cap 60 to lock the bit 14" in any preset position. By the arrangement thus described the apparatus is modified into a conventional boring bar, and cutting adjustments are usually effected by shifting the entire bar assembly laterally with respect to the axis of rotation of work being bored. In such instances only one tool bit is utilized, and no means need be provided for adjusting the bit with respect to the support 10.

The advantages of the invention should now be apparent. I have provided an adjustable boring bar assembly of generally simplified and improved construction which is both rugged and versatile and which is capable of unusually high rates of production in normal use.

A particularly advantageous feature of the invention resides in my improved arrangement for adjusting tool bits 14 and 15 comprising the tubular operating rod 17 and the tension rod 35 slidably positioned therein providing positive and accurate but highly simplified means for adjusting a plurality of tool bits, and locking the same in adjusted position, from one end of the boring bar assembly and remote from the tool bits. The arrangement is such that conventional tool bits may be employed in the apparatus with little or no modification, and for this reason a supply of such tool bits may be kept at hand for a variety of types of cutting operations and for a variety of materials.

Another advantageous feature of my invention resides in the construction of the adjusting and locking mechanism whereby the cutting tools may be clamped under a predetermined pressure and adjustment of the tools may be thereafter effected without altering such clamping pressure. This arrangement is particularly desirable in the cutting of beveled surfaces, for example, wherein radial adjustment of the cutters must be carried out during the progress of the cutting operation, at which time it is necessary, or at least highly desirable, to maintain a certain amount of clamping pressure upon the tool bits.

Other obvious advantages of the invention reside in the ease with which the assembly may be modified to accommodate elongated cutting tools, for boring operations in openings substantially larger than the main support member 10, and in the simplified modification rendering the assembly usable as a conventional boring bar.

It should be understood, however, that the apparatus herein specifically disclosed and described is intended to be illustrative only, and reference should therefore be had to the appended claims in determining the full scope of the invention.

I claim:

1. In a boring bar assembly the combination of an elongated tubular support member having slots at one end thereof, cutting tools received in said slots and movable therein radially with respect to said support member, an elongated operating rod slidably received within said support member, said operating rod having inclined surfaces at the end thereof adjacent said one end, said inclined surfaces underlying said cutting tools and adapted upon longitudinal movement of said operating rod to cause radial movement of said cutting tools, clamping means for said cutting tools comprising an end cap having portions received in said slots, a tension rod engaging said end cap and slidably received within said operating rod, and independent means at the other end of said support member to move said operating and tension rods independently with respect to said support member.

2. Apparatus according to claim 1 further characterized by said independent means comprising an internally threaded member rotatably received in said support, said operating rod being threaded adjacent said last mentioned member and in threaded engagement therewith.

3. Apparatus according to claim 2 further characterized by said independent means further comprising a second internally threaded member engaging said tension rod.

4. In a boring bar assembly of the type having a support member, radially adjustable cutting tools received in said support member, clamping means for said cutting tools, and independent control means for said tools and clamping means extending through said support member from one end to the other; the improvement comprising a first operating wheel carried by said support and having means engaging the control means for said tools whereby upon rotation of said wheel said tools are moved radially, a second operating wheel adapted for relative rotation with respect to said first operating wheel and having means engaging the control means for said clamping means whereby upon rotation of said second wheel said clamping means are actuated, and locking means carried by said second operating wheel for locking said clamping means in predetermined clamping relation, said control means for said tools being movable independently of said clamping means.

5. Apparatus according to claim 4 further characterized by said clamping means being adjustable by rotation of said second operating wheel relative to said first operating wheel, and said locking means comprising releasable means for interlocking said first and second operating wheels.

6. Apparatus according to claim 4 further characterized by said control means for said tools comprising an operating rod threaded at one end, threaded means operated by said first wheel for effecting longitudinal movement of said operating rod, said control means for said clamping means comprising a tension rod received within said operating rod and threaded at one end adjacent the threaded end of said operating rod, a nut engaging the threaded end of said tension rod and adapted to bear against the end surface of said operating rod, means for rotating said threaded means, and means for rotating said nut, said locking means comprising means to interlock said means for rotating said nut and means for rotating said threaded means whereby adjustment of said cutting tools may be effected under predetermined clamping pressure.

7. In a boring bar assembly the combination of an elongated tubular support member having slots at one end thereof, cutting tools received in said slots and movable therein radially with respect to said support member, an elongated operating rod slidably received within said support member, said operating rod having inclined surfaces at the end thereof adjacent said one end, said inclined surfaces underlying said cutting tools and adapted upon longitudinal movement of said operating rod to cause radial movement of said cutting tools, clamping means for said cutting tools comprising an end cap having portions received in said slots, means to draw said clamping means into clamping engagement with tools received in said slots, and means operable from the other end of said support member for releasing said clamping means to permit movement of said tools in said slots in a direction longitudinal of said support member.

8. Apparatus according to claim 7 further characterized by said clamping means comprising an end cap member positioned at the end of said support member, and yieldable means urging said end cap away from said support whereby upon release of said clamping means said end cap is moved away from said support member to free said tools.

9. Apparatus according to claim 8 further characterized by said end cap having projecting lugs received in said slots, and guide means engaging said support member and end cap for maintaining said lugs in alignment with said slots while said clamping means is in a released condition.

10. In a boring bar assembly the combination of an elongated support member, a plurality of cutting tools adjustably carried by said support member at one end thereof, clamping means for said cutting tools carried at said one end of said support and adapted to apply clamping pressure to said tools, first control means operable from the other end of said support for adjusting said cutting tools, second control means operable from said other end of said support for operating said clamping means, said first and second control means comprising first and second operating wheels, means associated with said second operating wheel and operative upon rotation of said second wheel relative to said first wheel to operate said clamping means, and means to lock said wheels against relative rotation.

11. Apparatus according to claim 10 further characterized by said means to lock comprising a member carried by said first wheel having a plurality of spaced bores therein, and a pin retractably carried by said second wheel and adapted to be received in any of said bores.

12. In a boring bar assembly the combination of an elongated support member, a plurality of cutting tools adjustably carried by said support at one end thereof, means to apply clamping pressure to said cutting tools, first control means operable from the other end of said support members for adjusting said cutting tools, second control means operable from said other end for operating said clamping means, means for locking said clamping means in predetermined clamping relation, said first control means being operable independently of said clamping means.

13. Apparatus according to claim 12 further characterized by said support member having open slots for receiving said cutting tools, said clamping means comprising retaining means for retaining said tools in said slots, and means operable from said other end for releasing said clamping means to permit movement of said tools relative to said support in a direction longitudinal of said support.

RUSSELL F. ROGERS.

References Cited in the file of this patent

UNITED STATES PATENTS

| Number | Name | Date |
|---|---|---|
| 569,433 | Smith | Oct. 13, 1896 |
| 886,830 | Martin | May 5, 1908 |
| 922,346 | Shattuck | May 18, 1909 |
| 1,366,733 | Jung | Jan. 25, 1921 |